United States Patent
Okada et al.

(10) Patent No.: US 9,186,983 B2
(45) Date of Patent: Nov. 17, 2015

(54) LID BOX JOINING STRUCTURE AND JOINING METHOD

(71) Applicants: KABUSHIKI KAISHA TOYOTA JIDOSHOKKI, Kariya-shi, Aichi (JP); TOYOTA JIDOSHA KABUSHIKI KAISHA, Toyota-shi, Aichi (JP)

(72) Inventors: Akihisa Okada, Kariya (JP); Nobukazu Kato, Kariya (JP); Yasuhiro Hatta, Kariya (JP); Hirofumi Arima, Kariya (JP); Kenji Chiba, Tokai (JP)

(73) Assignees: KABUSHIKI KAISHA TOYOTA JIDOSHOKKI, Aichi-ken (JP); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/375,322

(22) PCT Filed: Jan. 7, 2013

(86) PCT No.: PCT/JP2013/050043
§ 371 (c)(1),
(2) Date: Jul. 29, 2014

(87) PCT Pub. No.: WO2013/114910
PCT Pub. Date: Aug. 8, 2013

(65) Prior Publication Data
US 2015/0015020 A1  Jan. 15, 2015

(30) Foreign Application Priority Data
Feb. 1, 2012  (JP) .................................. 2012-020217

(51) Int. Cl.
*B62D 25/00*  (2006.01)
*B60K 15/04*  (2006.01)
(Continued)

(52) U.S. Cl.
CPC .................. *B60K 15/04* (2013.01); *B23K 11/00* (2013.01); *B23K 11/002* (2013.01); *B23K 11/11* (2013.01);
(Continued)

(58) Field of Classification Search
CPC .................. H01L 2924/00; H01L 2924/00014; H01L 2224/48091; H01L 2924/10253; H01L 2924/1461; B32B 5/26; B32B 27/12; D04H 13/007; D04H 3/04; Y10T 428/24124
USPC ........... 296/97.22; 114/102.55; 128/109, 167, 128/911
See application file for complete search history.

(56) References Cited

U.S. PATENT DOCUMENTS 4,573,694 A * 3/1986 Goto et al. ..................... 280/834
6,033,006 A * 3/2000 Bovellan et al. ........... 296/97.22
(Continued)

FOREIGN PATENT DOCUMENTS

JP  61-64535 A  4/1986
JP  1-109426 U  7/1989
(Continued)

OTHER PUBLICATIONS

International Search Report for PCT/JP2013/050043 dated Apr. 2, 2013 [PCT/ISA/210].
(Continued)

Primary Examiner — Kiran B Patel
(74) Attorney, Agent, or Firm — Sughrue Mion, PLLC (57) ABSTRACT

In a joining structure of a lid box according to an embodiment of the invention, a joining area where a joining surface of a joining portion of a side outer panel faces a joining surface of a joining portion of the lid box includes a first area where the joining surfaces come into contact with each other and are supposed to be subjected to spot-welding and a second area where the joining surfaces are separated from each other by a predetermined gap and are supposed to be subjected to laser-welding, and the spot-welding is performed on the first area or the laser-welding is performed on the second area. For that reason, since the joining states respectively suitable for the spot-welding and the laser-welding are realized, sufficient welding quality is ensured in both the spot-welding and the laser-welding.

3 Claims, 6 Drawing Sheets (51) Int. Cl.
*B23K 11/00* (2006.01)
*B23K 26/32* (2014.01)
*B23K 33/00* (2006.01)
*B23K 11/11* (2006.01)
*B23K 26/20* (2014.01)
*B23K 28/02* (2014.01)
*B62D 25/02* (2006.01)
*B23K 26/22* (2006.01)
*B60K 15/05* (2006.01)

(52) U.S. Cl.
CPC ............... *B23K 26/20* (2013.01); *B23K 26/22* (2013.01); *B23K 26/3293* (2013.01); *B23K 28/02* (2013.01); *B23K 33/008* (2013.01); *B62D 25/02* (2013.01); *B23K 2201/006* (2013.01); *B60K 2015/047* (2013.01); *B60K 2015/0474* (2013.01); *B60K 2015/0553* (2013.01)

(56) References Cited

U.S. PATENT DOCUMENTS

| | | | | |
|---|---|---|---|---|
| 6,234,555 | B1 * | 5/2001 | Emmerich et al. | 296/97.22 |
| 6,435,233 | B1 * | 8/2002 | Miura et al. | 141/390 |
| 7,311,348 | B1 * | 12/2007 | Bang | 296/97.22 |
| 7,740,301 | B2 * | 6/2010 | Hirano | 296/97.22 |
| 8,251,439 | B2 * | 8/2012 | Yasuda | 296/193.06 |
| 8,794,467 | B2 * | 8/2014 | Zentner | 220/86.2 |
| 8,845,001 | B2 * | 9/2014 | Kotama et al. | 296/97.22 |
| 9,039,063 | B2 * | 5/2015 | Jakobs et al. | 296/97.22 |
| 2001/0054829 | A1 * | 12/2001 | Hagano et al. | 296/97.22 |
| 2005/0005998 | A1 * | 1/2005 | Miura et al. | 141/382 |
| 2005/0092752 | A1 * | 5/2005 | Hagano et al. | 220/375 |
| 2007/0040409 | A1 * | 2/2007 | Alfaro | 296/97.22 |
| 2010/0230992 | A1 * | 9/2010 | Winkler et al. | 296/97.22 |
| 2010/0237650 | A1 * | 9/2010 | Takahashi et al. | 296/97.22 |
| 2012/0161462 | A1 * | 6/2012 | Zentner | 296/97.22 |
| 2013/0095678 | A1 * | 4/2013 | Hara | 439/136 |
| 2013/0134737 | A1 * | 5/2013 | Ogata et al. | 296/97.22 |

FOREIGN PATENT DOCUMENTS

| | | |
|---|---|---|
| JP | 3-94322 U | 9/1991 |
| JP | 7-54025 Y2 | 12/1995 |
| JP | 11-254979 A | 9/1999 |
| JP | 2000-326078 A | 11/2000 |
| JP | 2001-276991 A | 10/2001 |
| JP | 2004-209549 A | 7/2004 |
| JP | 2006-315062 A | 11/2006 |
| JP | 2007-131147 A | 5/2007 |

OTHER PUBLICATIONS

International Preliminary Report on Patentability dated Aug. 14, 2014, from the International Searching Authority in counterpart International Application No. PCT/JP2013/050043.

* cited by examiner

Fig.6 PRIOR ART

LID BOX JOINING STRUCTURE AND JOINING METHOD

CROSS REFERENCE TO RELATED APPLICATIONS

This application is a National Stage of International Application No. PCT/JP2013/050043, filed on Jan. 7, 2013, which claims priority from Japanese Patent Application No. 2012-020217, filed on Feb. 1, 2012, the contents of all of which are incorporated herein by reference in their entirety.

TECHNICAL FIELD

The present invention relates to a lid box joining structure that joins a lid box to a side outer panel of a vehicle body and a joining method thereof.

BACKGROUND ART

In general, oil or electric power is supplied to an automobile or an electric automobile through a lid box provided in an outer panel (particularly, a side outer panel) of a vehicle body. The lid box is separated from the outer panel of the vehicle body, and for example, Patent Literature 1 below discloses a technique of joining the lid box to the side outer panel by spot-welding.

Figure 6:
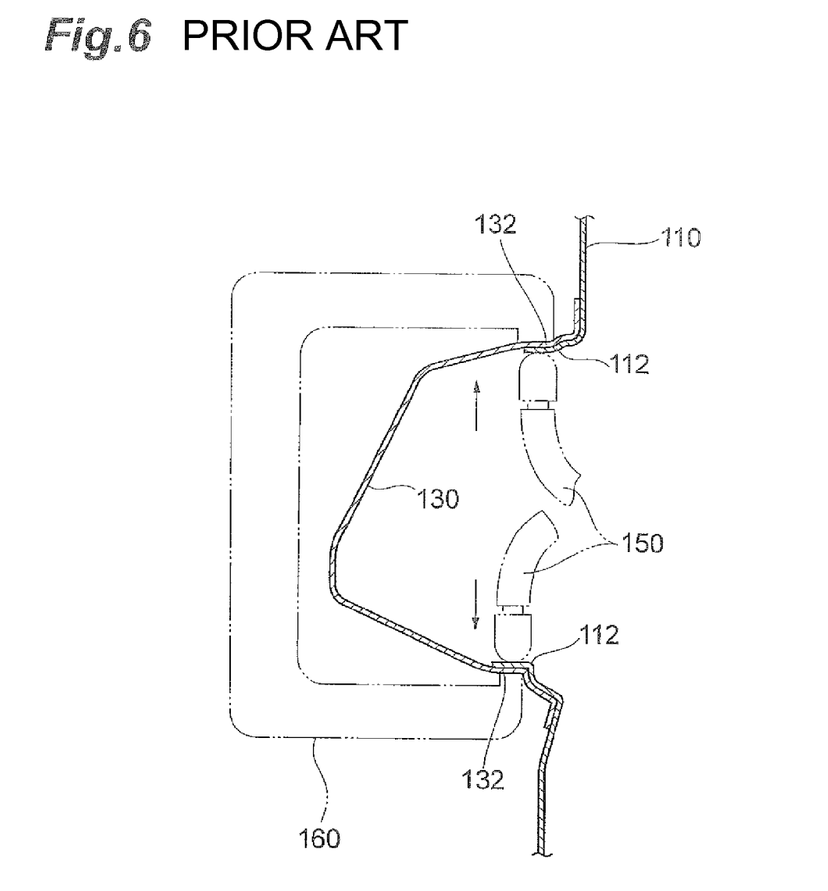
FIG. 6 is a view illustrating a lid box joining structure according to the related art.

In the spot-welding, as illustrated in FIG. 6, a welding gun 150 and a back electrode 160 are used, a joining surface of a portion 112 made by bending a side outer panel 110 in the vehicle inner direction is pressed by the welding gun 150 in the direction indicated by the arrow of the drawing, and is spot-welded while completely coming into close contact with a joining surface of an edge 132 of a cup-shaped lid box 130.

CITATION LIST

Patent Literature

Patent Literature 1: Japanese Patent Application Laid-Open (JP-A) No. 11-254979
Patent Literature 2: Japanese Utility Model Application Laid-Open (JP-Y) No. 01-109426
Patent Literature 3: Japanese Utility Model Application Laid-Open (JP-Y) No. 03-094322
Patent Literature 4: Japanese Patent Application Laid-Open (JP-A) No. 61-064535

SUMMARY OF INVENTION

Technical Problem

The joining structure in which the joining surface of the side outer panel 110 and the joining surface of the lid box 130 completely come into close contact with each other is suitable for spot-welding, but is not suitable for laser-welding. This is because a gas is generated by welding during the laser-welding. However, in the joining structure in which the joining surfaces completely come into close contact with each other, the gas discharge path may not be ensured. As a result, there is a concern that sufficient welding quality may not be ensured when the joining surfaces are joined to each other by the laser-welding according to the above-described conventional joining structure.

The invention is made to solve the above-described problems, and an object thereof is to provide a lid box joining structure and a joining method capable of ensuring sufficient welding quality in both spot-welding and laser-welding.

Solution to Problem

A lid box joining structure according to the invention is a lid box joining structure that joins a lid box to a side outer panel of a vehicle body, wherein a joining area where a joining surface of the side outer panel faces a joining surface of the lid box includes a first area where the joining surface of the side outer panel and the joining surface of the lid box come into contact with each other and are supposed to be subjected to spot-welding and a second area where the joining surface of the side outer panel and the joining surface of the lid box are separated from each other by a predetermined gap and are supposed to be subjected to laser-welding, and wherein the spot-welding is performed in the first area or the laser-welding is performed in the second area.

In the lid box joining structure, since the first area and the second area are provided in the joining area where the joining surface of the side outer panel faces the joining surface of the lid box, the joining states respectively suitable for the spot-welding and the laser-welding are realized, and hence sufficient welding quality is ensured in both the spot-welding and the laser-welding.

Furthermore, the separation distance between the joining surface of the side outer panel and the joining surface of the lid box may gradually increase from the first area toward the second area. Further, at least one of the joining surface of the side outer panel and the joining surface of the lid box may be provided with a step portion, and the first area and the second area are separated from each other by the step portion.

A lid box joining method according to the invention is a lid box joining method of joining a lid box to a side outer panel of a vehicle body, the lid box joining method including: causing a joining surface of the side outer panel and a joining surface of the lid box to face each other so that a joining area where the joining surface of the side outer panel faces the joining surface of the lid box includes a first area where the joining surface of the side outer panel and the joining surface of the lid box come into contact with each other and are supposed to be subjected to spot-welding and a second area where the joining surface of the side outer panel and the joining surface of the lid box are separated from each other by a predetermined gap and are supposed to be subjected to laser-welding; and performing the spot-welding on the first area or performing the laser-welding on the second area.

In the lid box joining method, since the first area and the second area are provided in the joining area where the joining surface of the side outer panel faces the joining surface of the lid box, the joining states respectively suitable for the spot-welding and the laser-welding are realized, and hence sufficient welding quality in both the spot-welding and the laser-welding is ensured.

Furthermore, in the causing the joining surface of the side outer panel and the joining surface of the lid box to face each other, the separation distance between the joining surface of the side outer panel and the joining surface of the lid box may gradually increase from the first area toward the second area or the first area and the second area may face each other while being separated by a step portion provided in at least one of the joining surface of the side outer panel and the joining surface of the lid box.

Advantageous Effects of Invention

According to the invention, it is possible to provide a lid box joining structure and a joining method capable of ensuring sufficient welding quality in both spot-welding and laser-welding.

DESCRIPTION OF EMBODIMENTS

Hereinafter, a preferred embodiment of the invention will be described in detail by referring to the accompanying drawings. Furthermore, in the description, the same reference numeral will be given to the same component or the component having the same function, and the repetitive description thereof will be omitted. region Hereinafter, a lid box according to the embodiment of the invention will be described by referring to FIGS. 1 and 2. Furthermore, the coordinate axis of the drawings is set based on the vehicle, the X axis indicates the front to rear direction of the vehicle, the Y axis indicates the left and right direction of the vehicle, and the Z axis indicates the height direction of the vehicle.

Figure 1:
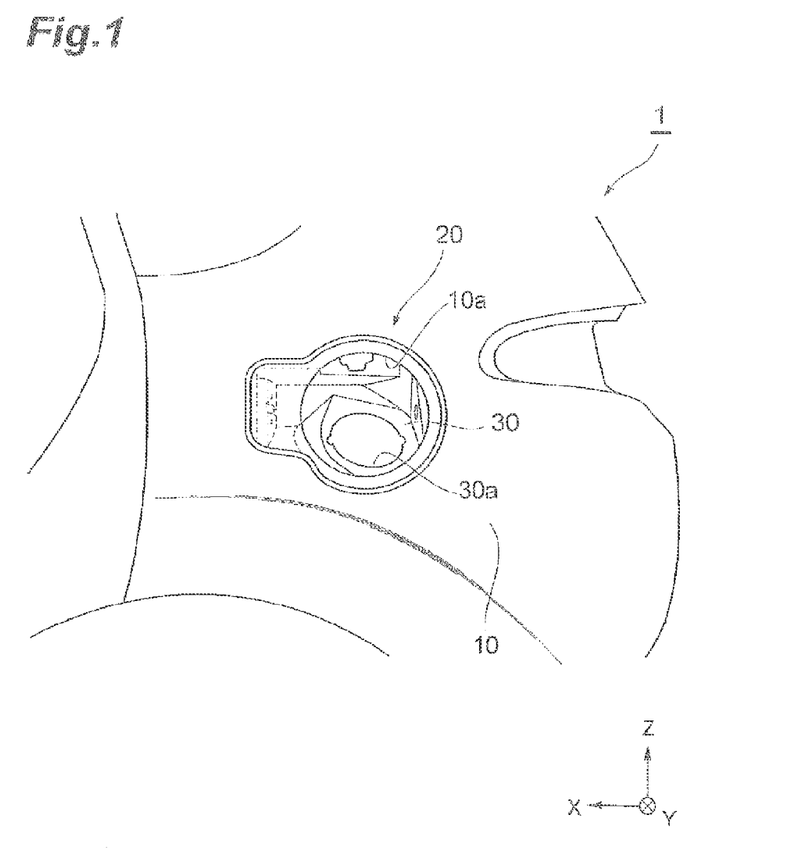
FIG. 1 is a view illustrating an oil supply portion provided in a side surface of a vehicle body according to an embodiment of the invention.
Figure 2:
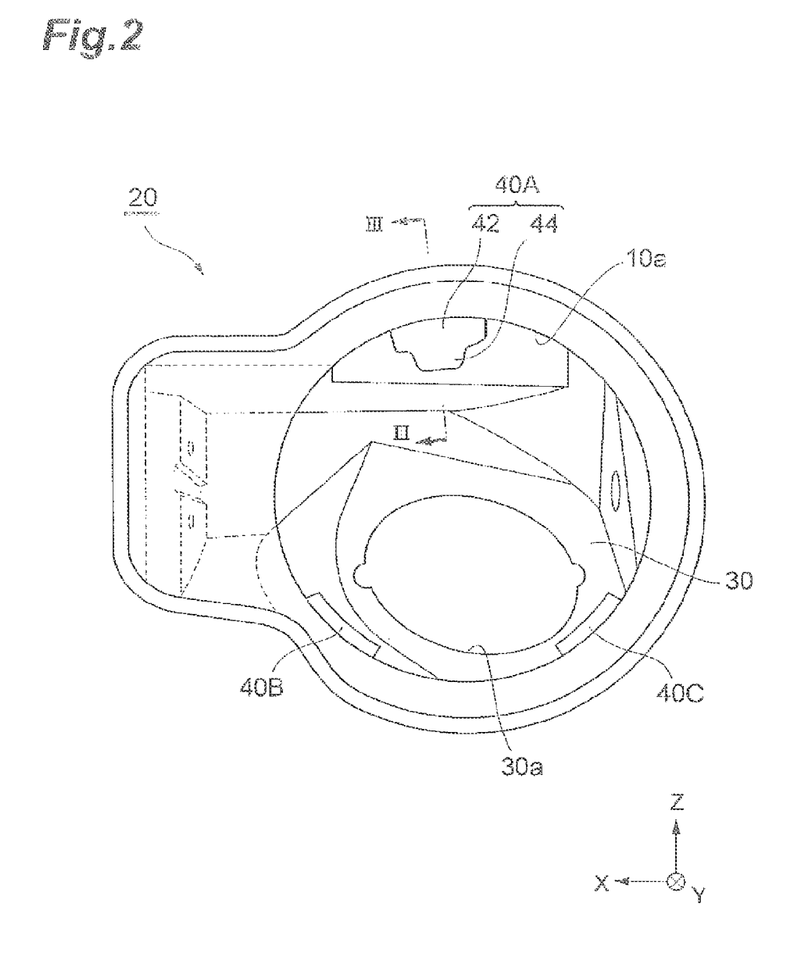
FIG. 2 is an enlarged view of the oil supply portion illustrated in FIG. 1.

As illustrated in FIGS. 1 and 2, the side surface of a vehicle body 1, that is, a side outer panel 10 thereof is provided with a lid box mounting portion 20 used for, for example, an oil supply operation or an electric power supply operation. The side outer panel 10 in the lid box mounting portion 20 is provided with a substantially circular opening 10a, and a cup-shaped lid box 30 is joined to the edge of the opening 10a in a direction from the inside of the vehicle body. More specifically, the edge of the opening 10a of the side outer panel 10 is provided with three tongue-shaped portions 40A, 40B, and 40C, and the lid box 30 is joined to the tongue-shaped portions 40A, 40B, and 40C. The tongue-shaped portions 40A, 40B, and 40C are provided at the substantially same interval so that the tongue-shaped portion 40A is provided at the position (the position of twelve o'clock of the clock) directly above the circular opening 10a, the tongue-shaped portion 40B is provided at the right lower position (the position of four o'clock of the clock) toward the opening 10a, and the tongue-shaped portion 40C is provided at the left lower position (the position of eight o'clock of the clock) toward the opening 10a.

Hereinafter, a joining structure 50 of the lid box 30 in the tongue-shaped portions 40A, 40B, and 40C of the side outer panel 10 will be described in more detail by referring to FIGS. 2 and 3. Furthermore, since the joining structure of the lid box 30 is the same in any of three tongue-shaped portions 40A, 40B, and 40C, only the joining structure of the lid box 30 in the tongue-shaped portion 40A will be described, and the joining structures in the tongue-shaped portions 40B and 40C will not be described.

Figure 3:
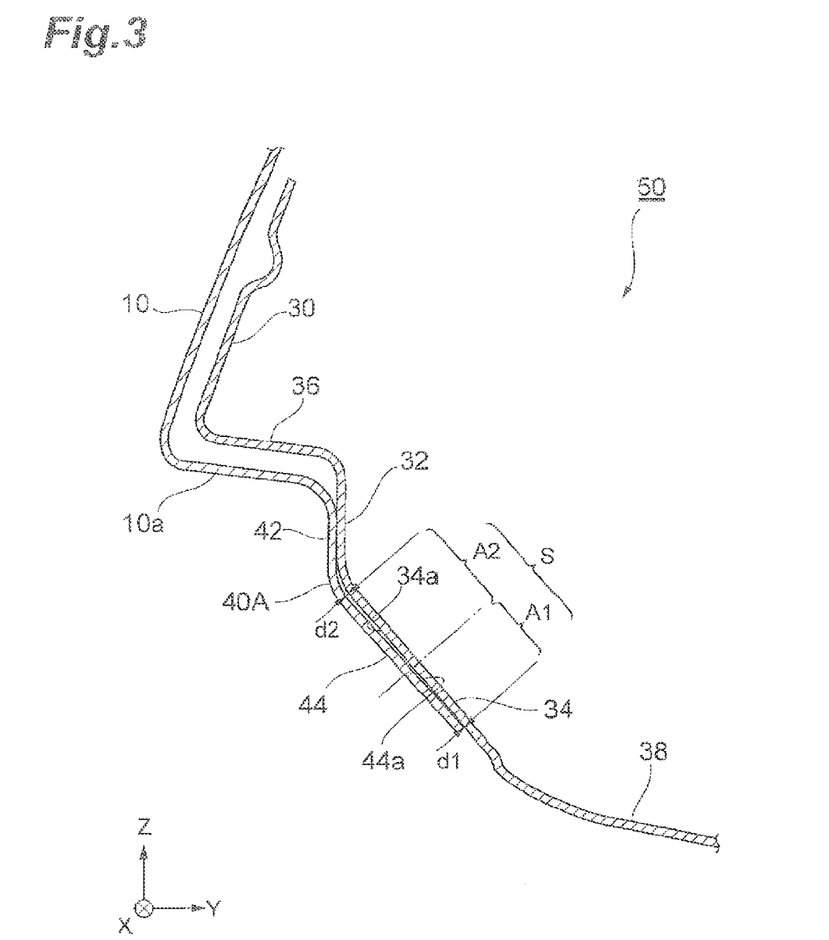
FIG. 3 is a cross-sectional view taken along the line III-III of a side outer panel and a lid box illustrated in FIG. 2.

As illustrated in FIG. 3, the edge of the opening 10a of the side outer panel 10 is curved in the vehicle inner direction (the Y direction of the drawing), and the end of the edge thereof is provided with the tongue-shaped portion 40A. The tongue-shaped portion 40A includes a position regulation portion 42 that extends downward in the perpendicular direction from the end of the edge of the opening 10a and a joining portion 44 that is narrower than the position regulation portion 42 and extends from the position regulation portion 42 toward the lower side and the inner side of the vehicle.

Meanwhile, the edge of the lid box 30 is provided with a joining portion 34 that is a portion joined to the joining portion 44 of the tongue-shaped portion 40A and has a joining surface 34a facing a joining surface 44a of the joining portion 44.

The edge of the joining portion 34 is provided with a contact portion 32 which is a portion contacting the position regulation portion 42 of the tongue-shaped portion 40A and extending upward in the perpendicular direction. Furthermore, since the contact portion 32 and the position regulation portion 42 are employed, the contact portion 32 of the lid box 30 contacts the position regulation portion 42 of the tongue-shaped portion 40A of the side outer panel 10 when the lid box 30 is positioned with respect to the side outer panel 10, and hence high positioning precision can be realized.

A portion 36 at the outer edge of the contact portion 32 follows the curved shape of the side outer panel 10 so that the gap with respect to the side outer panel 10 has a substantially uniform gap width. Further, a portion 38 at the side of the body (at the opposite side of the edge) of the joining portion 34 extends in the vehicle inner direction (the Y direction) so as to have a cup shape.

Subsequently, a positional relation between the joining portion 44 of the tongue-shaped portion 40A and the joining portion 34 of the lid box 30 will be described in detail.

As illustrated in FIG. 3, the facing surfaces between the joining portions 34 and 44 in a joining area S formed between the joining portion 44 of the tongue-shaped portion 40A and the joining portion 34 of the lid box 30 are not completely parallel to each other, but are slightly inclined. Specifically, the distal end of the joining portion 44 of the tongue-shaped portion 40A is completely joined to the joining portion 34 of the lid box 30 so that a separation distance d1 between the joining surface 44a and the joining surface 34a of the joining portion 34 of the lid box 30 becomes 0. Meanwhile, the proximal end of the joining portion 44 of the tongue-shaped portion 40A is set so that the joining surface 44a and the joining surface 34a of the joining portion 34 of the lid box 30 are separated from each other by a predetermined distance d2 (for example, 0.4 mm). As a result, the separation distance between two joining surfaces 34a and 44a gradually increases from the distal end of the joining portion 44 of the tongue-shaped portion 40A toward the proximal end thereof.

That is, the separation distance between two joining surfaces 34a and 44a in an area (a first area) A1 near the distal end of the joining portion 44 is 0 or so short as to be substantially 0. For that reason, the area A1 is suitable for the spot-welding capable of realizing high welding quality when the welding subjects contact each other.

Meanwhile, two joining surfaces 34a and 44a are separated from each other in an area (a second area) A2 near the proximal end of the joining portion 44, and a gap is formed therebetween. For that reason, the area A2 is suitable for the laser-welding capable of realizing high welding quality when a gap exists between the welding subjects. That is, since a gas caused by the laser-welding is discharged to the outside of the joining area S from the gap, high welding quality is realized compared to the case where no gap is formed.

Then, in the joining structure 50, the spot-welding in the first area A1 or the laser-welding in the second area A2 is performed.

That is, according to the joining structure 50 of the lid box 30, since the first area A1 and the second area A2 are provided in the joining area S where the joining surface 44a of the joining portion 44 of the side outer panel 10 and the joining surface 34a of the joining portion 34 of the lid box 30 face each other, the joining states respectively suitable for the spot-welding and the laser-welding are realized. Accordingly, according to the joining structure 50, it is possible to ensure sufficient welding quality in both the spot-welding and the laser-welding.

That is, in a case where the lid box 30 is joined to the side outer panel 10 of the vehicle body 1, the joining structure 50 is formed by firstly causing the joining surfaces 34a and 44a to face each other so that the first area A1 and the second area A2 are included in the joining area S where the joining surface 44a of the joining portion 44 of side outer panel 10 faces the joining surface 34a of the joining portion 34 of the lid box 30. Subsequently, since the spot-welding in the first area A1 or the laser-welding in the second area A2 is performed, sufficient welding quality can be ensured.

For example, in a case where the lid box joining process is performed by separate factories, the factories may have different facilities. That is, one factory may have a facility only for the spot-welding and the other factory may have a facility only for the laser-welding. According to the joining structure 50, sufficient welding quality can be ensured in any one of the spot-welding and the laser-welding without performing mold plating in each factory.

Figure 4:
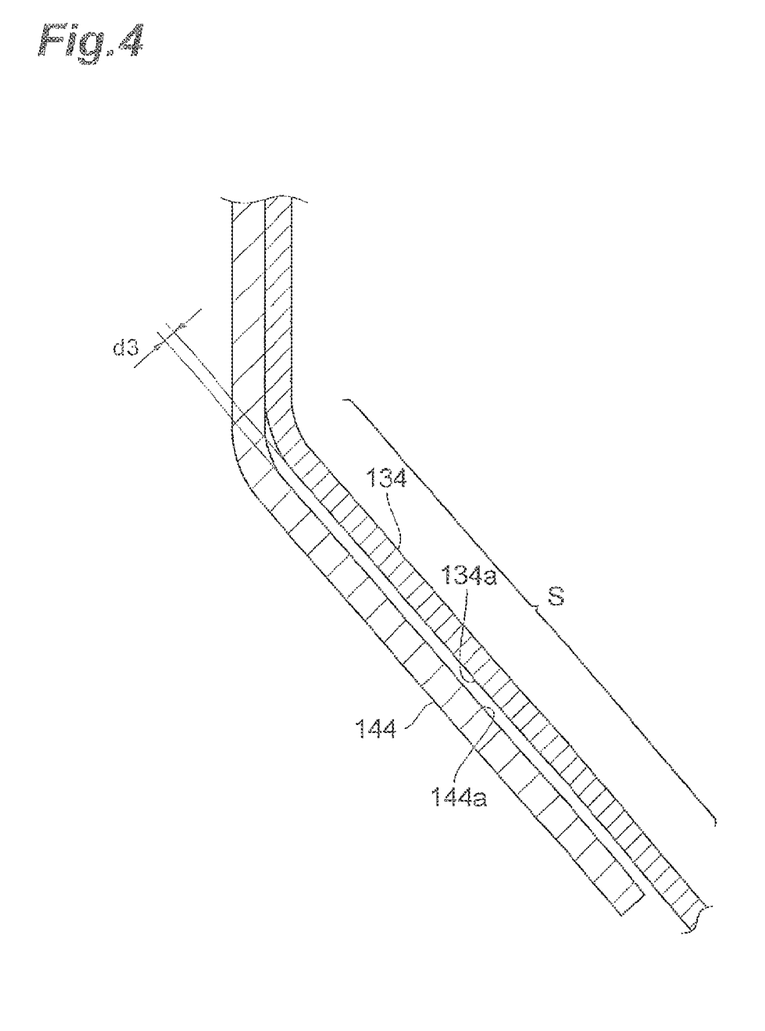
FIG. 4 is a view illustrating a state where a separation distance between a joining surface of the side outer panel and a joining surface of the lid box is uniform.

Meanwhile, in the joining structure according to the related art illustrated in FIG. 6, since the joining surface of the side outer panel 110 and the joining surface of the lid box 130 completely comes into close contact with each other, no gap is formed therebetween. Thus, this state is suitable for the spot-welding, but is not suitable for the laser-welding. Further, as illustrated in FIG. 4, in a case where a joining surface 144a of a joining portion 144 of the side outer panel and a joining surface 134a of a joining portion 134 of the lid box are completely parallel to each other and a gap of a uniform separation distance d3 (for example, 0.4 mm) is formed therebetween, the laser-welding is suitable. However, since the joining surfaces 134a and 144a do not contact each other, the spot-welding is not suitable. That is, in the joining structure illustrated in FIGS. 6 and 4, there is a concern that sufficient welding quality may not be ensured in both the spot-welding and the laser-welding. In particular, in the joining structure illustrated in FIG. 4, the side outer panel 10 is distorted after the laser-welding, and hence a problem arises in that the welding quality and the appearance (visual quality) are degraded.

Figure 5:
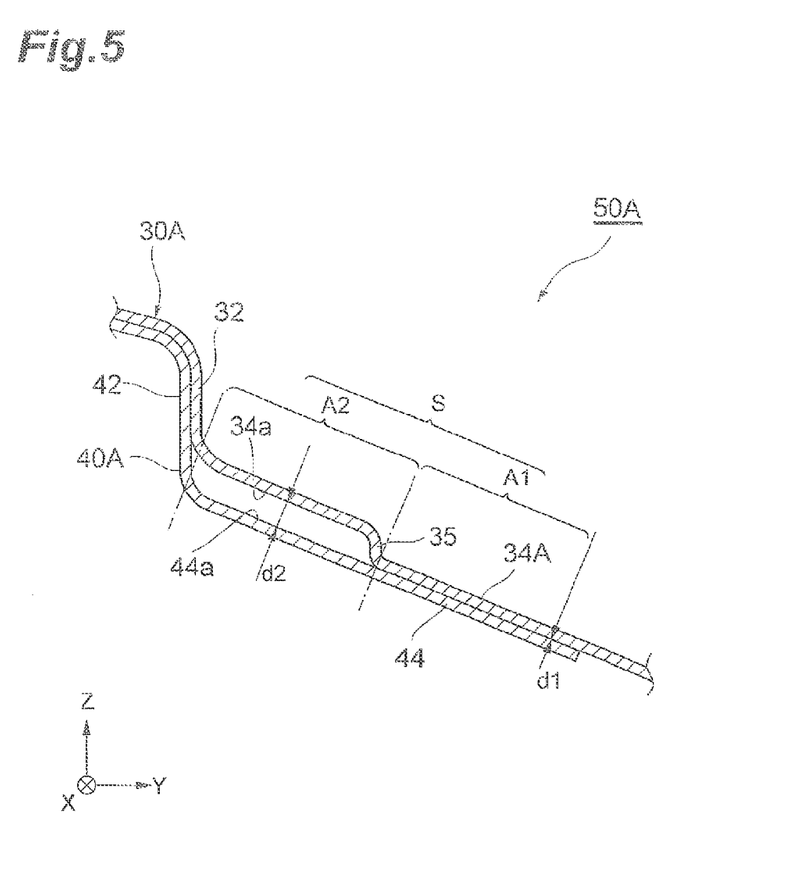
FIG. 5 is a cross-sectional view of a side outer panel and a lid box according to a configuration different from FIG. 3.

Furthermore, the joining structure 50 may be a joining structure 50A illustrated in FIG. 5.

In the joining structure 50A, a lid box 30A has a shape different from that of the lid box 30. That is, a step portion 35 is provided in the joining surface 34A of the lid box 30A. The step portion 35 is formed at the boundary between the first area A1 and the second area A2, and is bulged from the first area A1 toward the second area A2 so that a gap is not formed between the joining surfaces 34a and 44a in the first area A1 and a gap having a uniform separation distance d2 is formed between the joining surfaces 34a and 44a in the second area A2. In other words, the first area A1 and the second area A2 face each other so as to be separated by the step portion 35 provided in the joining surface 34a of the joining portion 34 of the lid box 30.

According to the joining structure 50A, since the joining states respectively suitable for the spot-welding and the laser-welding are realized by providing the first area A1 and the second area A2 in the joining area S as in the joining structure 50, sufficient welding quality may be ensured in both the spot-welding and the laser-welding.

Furthermore, the step portion separating the first area A1 and the second area A2 from each other does not need to be essentially provided in the joining portion 34, but may be provided in the joining portion 44. Further, the step portion may be provided in both the joining portion 34 and the joining portion 44.

Furthermore, the side outer panel 10 is provided with three tongue-shaped portions 40A, 40B, and 40C, but the number of the tongue-shaped portions is not essentially limited to three. For example, a configuration may be employed in which two or four or more tongue-shaped portions are provided.

REFERENCE SIGNS LIST

1: vehicle body
10: side outer panel
30: lid box
34: joining portion
34a: joining surface
35: step portion
40A, 40B, 40C: tongue-shaped portion
44: joining portion
44a: joining surface
50, 50A: joining structure
A1: first area
A2: second area
S: joining area

The invention claimed is:

1. A lid box joining structure that joins a lid box to a side outer panel of a vehicle body,
wherein a joining area where a joining surface of the side outer panel faces a joining surface of the lid box includes a first area where the joining surface of the side outer panel and the joining surface of the lid box come into contact with each other and are supposed to be subjected to spot-welding and a second area where the joining surface of the side outer panel and the joining surface of the lid box are separated from each other by a predetermined gap and are supposed to be subjected to laser-welding, and
wherein the spot-welding is performed in the first area or the laser-welding is performed in the second area.

2. The lid box joining structure according to claim 1,
wherein a separation distance between the joining surface of the side outer panel and the joining surface of the lid box gradually increases from the first area toward the second area.

3. The lid box joining structure according to claim 1,
wherein at least one of the joining surface of the side outer panel and the joining surface of the lid box is provided with a step portion, and the first area and the second area are separated from each other by the step portion.

* * * * *